(12) United States Patent
Yamanaka et al.

(10) Patent No.: US 7,634,291 B2
(45) Date of Patent: Dec. 15, 2009

(54) COMMUNICATION TERMINAL APPARATUS

(75) Inventors: Ryutaro Yamanaka, Osaka (JP);
Noriaki Minamida, Ishikawa (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 11/630,382

(22) PCT Filed: Jun. 21, 2005

(86) PCT No.: PCT/JP2005/011326

§ 371 (c)(1),
(2), (4) Date: Nov. 23, 2007

(87) PCT Pub. No.: WO2006/003809

PCT Pub. Date: Jan. 12, 2006

(65) Prior Publication Data

US 2008/0220802 A1 Sep. 11, 2008

(30) Foreign Application Priority Data

Jun. 30, 2004 (JP) ............................. 2004-193528

(51) Int. Cl.
H04B 7/00 (2006.01)
(52) U.S. Cl. ...................... 455/522; 455/67.11; 455/68; 455/69; 370/318
(58) Field of Classification Search ................. 455/522, 455/67.11, 68–70, 115.3, 129, 127.1, 127.2, 455/135, 226.3, 277.2, 296; 370/318
See application file for complete search history.

(56) References Cited

U.S. PATENT DOCUMENTS 7,411,918 B2 * 8/2008 Zhang ........................ 370/252

FOREIGN PATENT DOCUMENTS

WO          03 043221          5/2003

OTHER PUBLICATIONS

Japanese Office Action dated Apr. 22, 2008 with English translation thereof.
"TFC Selection and Compressed Mode," 3GPP TDocs R4-011571, TSG-RAN Working Group 4 (Radio) meeting #20, East Brunswick, New Jersey, Nov. 12-16, 2001, 2 pages total.
PCT International Search Report dated Oct. 25, 2005.
3GPP TS25.321 V5.8.0 (Mar. 2004), Release 5, pp. 49-51.

* cited by examiner

*Primary Examiner*—Duc Nguyen
*Assistant Examiner*—Dominic E Rego
(74) *Attorney, Agent, or Firm*—Dickinson Wright PLLC

(57) ABSTRACT

A communication terminal apparatus wherein even in a case of occurrence of a compressed mode, an evaluation can be performed by a detecting function to select an appropriate TFC (TRANS Format Combination). In this communication terminal apparatus, upon occurrence of a compressed mode, a compressed mode information generating part (173) outputs both a gap section and a gap start slot number for application to a transmission power determining part (174), which then counts the slots in which the TFC transmission power exceeds an upper limit for each TFC. At this moment, the transmission power determining part (174) replaces the TFC transmission power, for the slots of the gap section, by the TFC transmission power of the slots other than those of the gap section. ATFC status managing part (175) determines, based on the counting result of the transmission power determining part (174), the status of each TFC.

3 Claims, 14 Drawing Sheets

| X | Y | Z |
|---|---|---|
| 15 | 30 | 30 |

FIG. 3

COMMUNICATION TERMINAL APPARATUS

TECHNICAL FIELD

The present invention relates to a communication terminal apparatus used in a radio communication system of a CDMA scheme.

BACKGROUND ART

In uplink of the radio communication system, when total transmission power of the communication terminal apparatus exceeds the maximum transmission powers it is necessary to stop transmission of one of channels or perform control such as decreasing a transmission rate so that the total transmission power does not exceed the maximum transmission power. In a Release99 specification of 3GPP (3rd Generation Partnership Project) of W-CDMA, as a method for realizing this, a transport format combination selection (hereinafter referred to as TFC selection) is standardized. Here, the maximum transmission power indicates smaller one of maximum allowable uplink transmission power set by a control station and maximum transmission power of the communication terminal apparatus.

In TFC selection, when data is multiplexed with a plurality of DCHs (dedicated channel) and transmitted, the communication terminal apparatus determines whether or not the total transmission power exceeds the maximum transmission power for each transport format combination (hereinafter referred to as TFC) that is a combination of transport format (hereinafter referred to as TF) indicating the amount of data or the like transmitted at each DCH, and selects a transmittable TFC. In the following explanation, a set of all TFCs is referred to as TFCS (transport format combination set).

TFC selection will be described in detail below using the drawings. FIG. 1 shows a case of having two DCHs of DCH#1 having three TFs and DCH#2 having two TFs (FIG. 1(A)). In this case, as shown in FIG. 1(B), six patterns of TFC1 to TFC6 exist. In addition, in FIGS. 1(A) and (B), the number of bits of each TF is indicated with the length of the horizontal axis.

Here, it is necessary to increase a transmission rate in accordance with an increase of the number of bits that have to be transmitted in a unit of time, and in order to obtain predetermined quality, it is necessary to increase transmission power in accordance with an increase of the transmission rate. In FIG. 1(C), transmission power of each TFC is indicated with the length of the horizontal axis, and a dotted line indicates maximum transmission power Pmax.

In the case of FIG. 1(C), the communication terminal apparatus determines that transmission is possible in TFC1 to TFC3 in TFCS since the total transmission power falls below maximum transmission power Pmax, and determines that transmission is impossible in TFC4 to TFC6 in TFCS since the total transmission power exceeds maximum transmission power Pmax and transmission power is insufficient. Then, the communication terminal apparatus selects one TFC from TFC1 to TFC3 where it is determined that transmission is possible.

Next, a detection function and TFCS restriction function in TFC selection of Release99 will be described using the drawings.

As shown in a state transition diagram of FIG. 2, the communication terminal apparatus detects elimination criterion/recovery criterion for each TFC for each one frame (15 slots) as a detection function. To be more specific, in the TFC in a supported state (the state where transmission is possible), when there are at least X slots (X does not have to be consecutive) out of preceding consecutive Y slots, where transmission power necessary for the TFC exceeds the maximum transmission power, the elimination criterion is detected, and the state transits to an excess power state (the state where power is excessive). Further, in the TFC in an excess power state or blocked state (the state where transmission is stopped) when there are preceding consecutive Z slots where transmission power necessary for the TFC does not exceed the maximum transmission power, the recovery criterion is detected, and the state transits to the supported state. In addition, parameters X, Y and Z use a value indicated in FIG. 3 as a default value.

FIG. 4 shows a timing of the TFCS restriction function. As shown in FIG. 4, in the conventional TFC selection method, the state transits to the supported state using a detection function, and after $T_{delay\_transition}$ (with a default value of 60 ms), transits to the supported state using a restriction function. Further, the state transits to the excess power state using the detection function, and after $T_{delay\_transition}$, transits to the blocked state using the restriction function.

As described above, the communication terminal apparatus is capable of selecting optimal TFC for the current service out of a TFC group belonging to the updated supported state.

FIG. 5 shows an example of a timing of the detection function. In FIG. 5, the case where transmission power necessary for TFC exceeds the maximum transmission power is indicated as "×", the case of not exceeding is indicated as "○". Furthermore, parameters X, Y and Z use a value indicated in FIG. 3 as a default value (X=15, Y=30, and Z=30).

At evaluation point 1, there are 10 slots in which the maximum transmission power is exceeded in a measurement period of immediately preceding consecutive 30 slots, and therefore the state does not transit from the current state. Furthermore, at evaluation point 2, there are 15 slots in which the maximum transmission power is exceeded in the measurement period, and therefore, when the current state is the supported state, the state transits to the excess power state.

Here, when a compressed mode occurs during transmission as shown in FIG. 6, a period where slots are not transmitted (transmission gap period) occurs. When the transmission gap period exists, it is not possible to apply the evaluation method using the above-described detection function, and a new evaluation method is required.

Non-Patent Document 1: 3GPP Release99 TS25.321 11.4

DISCLOSURE OF INVENTION

Problems to be Solved by the Invention

However, until now, the evaluation method using the detection function that can be applied even when the compressed mode occurs has not been developed.

It is therefore an object of the present invention to select an appropriate TFC by performing evaluation using the detection function even when the compressed mode occurs.

Means for Solving the Problems

A communication terminal apparatus of the present invention is provided with a transmission gap period in which slots are not transmitted in a compressed mode, and adopts a configuration having: a transmission power calculation section that calculates transmission power of each TFC (Transport Format Combination); a maximum value calculation section that calculates a maximum value of the transmission power for TFC; a transmission power judging section that counts in a radio frame the number of slots where the transmission power of each TFC exceeds the maximum value in a measurement period of N slots (N is an integer number of two or more) from an immediately preceding past at least once at a predetermined timing; a count calculation section that multiplies a count result of the transmission power judging section by predetermined coefficients; a TFC state management section that determines each TFC state according to a calculation result of the count calculation section; and a TFC selection section that selects one TFC out of TFCs in a predetermined state.

ADVANTAGEOUS EFFECT OF THE INVENTION

According to the present invention, it is possible to select an appropriate TFC by performing evaluation using the detection function even when the compressed mode occurs.

BRIEF DESCRIPTION OF DRAWINGS

Figure 3:
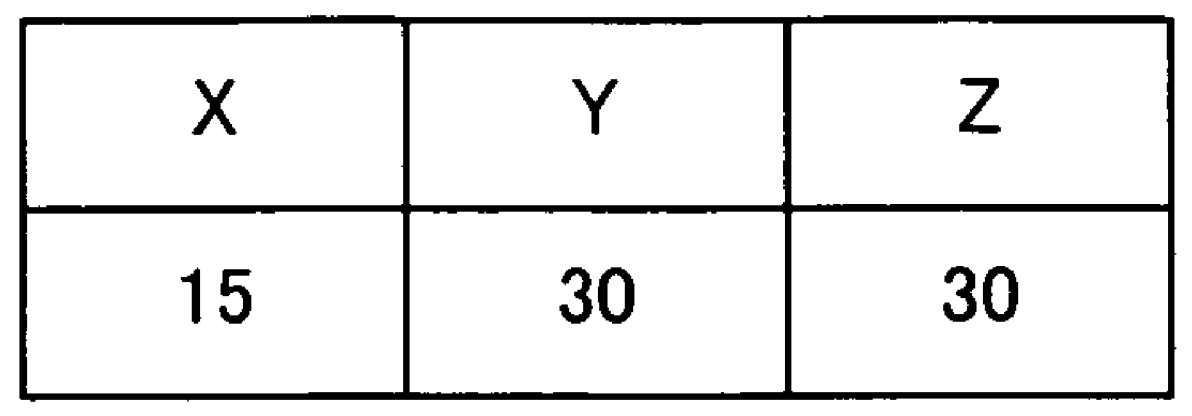

FIG. 3 shows parameters in TFC selection.

BEST MODE FOR CARRYING OUT THE INVENTION

Embodiments of the present invention will be described in detail below with reference to the accompanying drawings.

Embodiment 1

Figure 1:
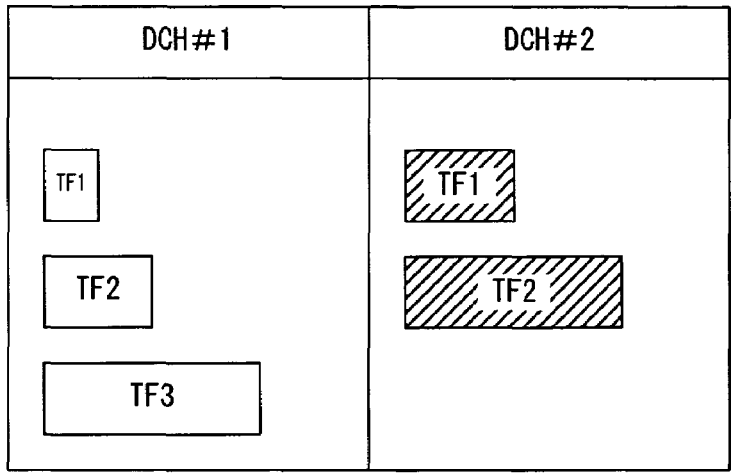
FIG. 1 illustrates TFC selection.
Figure 1:
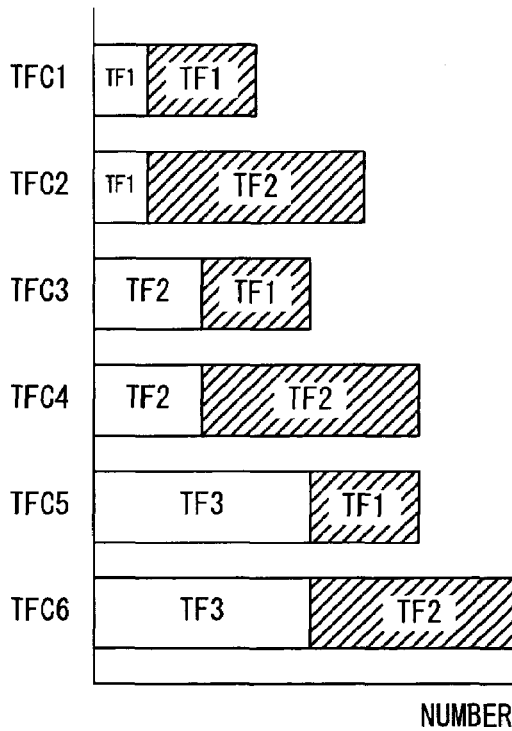
Figure 1:
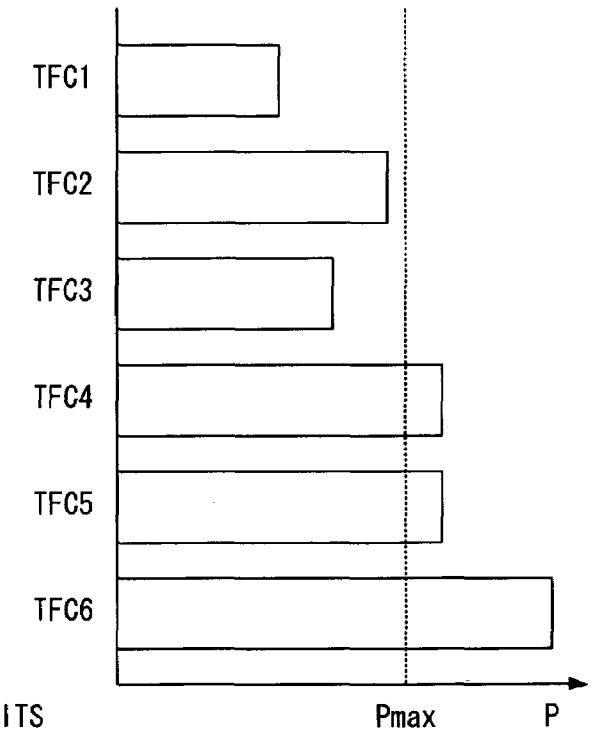
Figure 2:
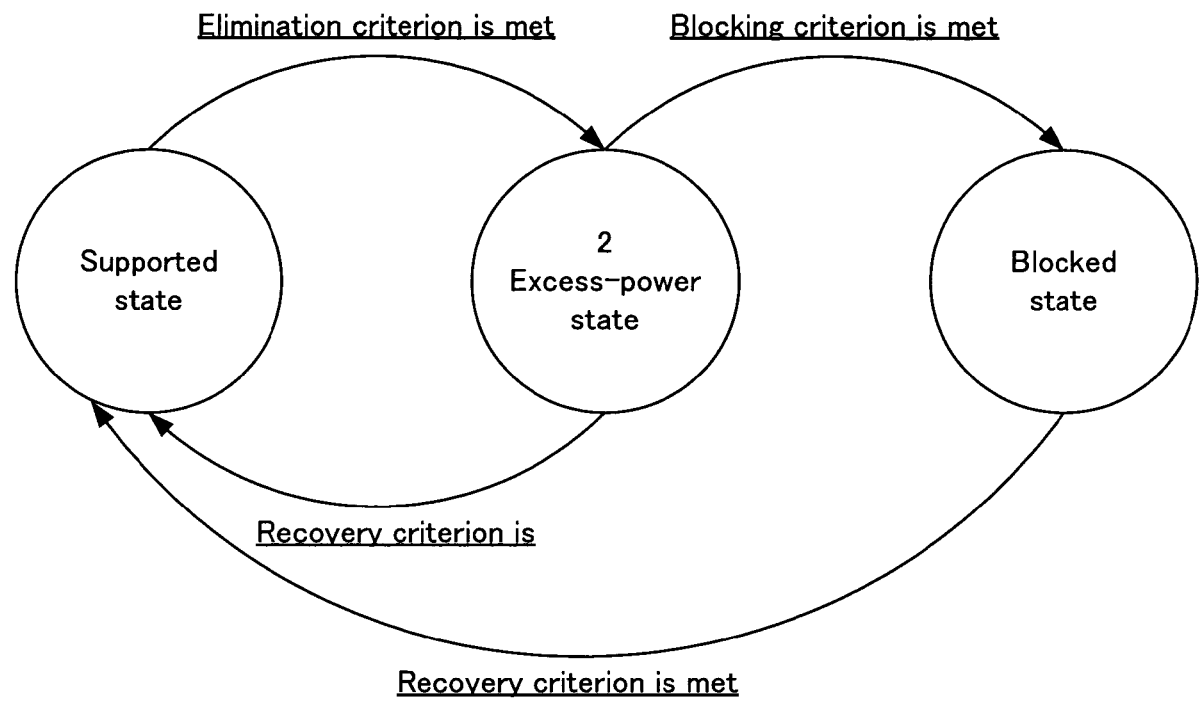
FIG. 2 is a state transition diagram showing a detection function of TFC selection and TFCS restriction function.
Figure 4:
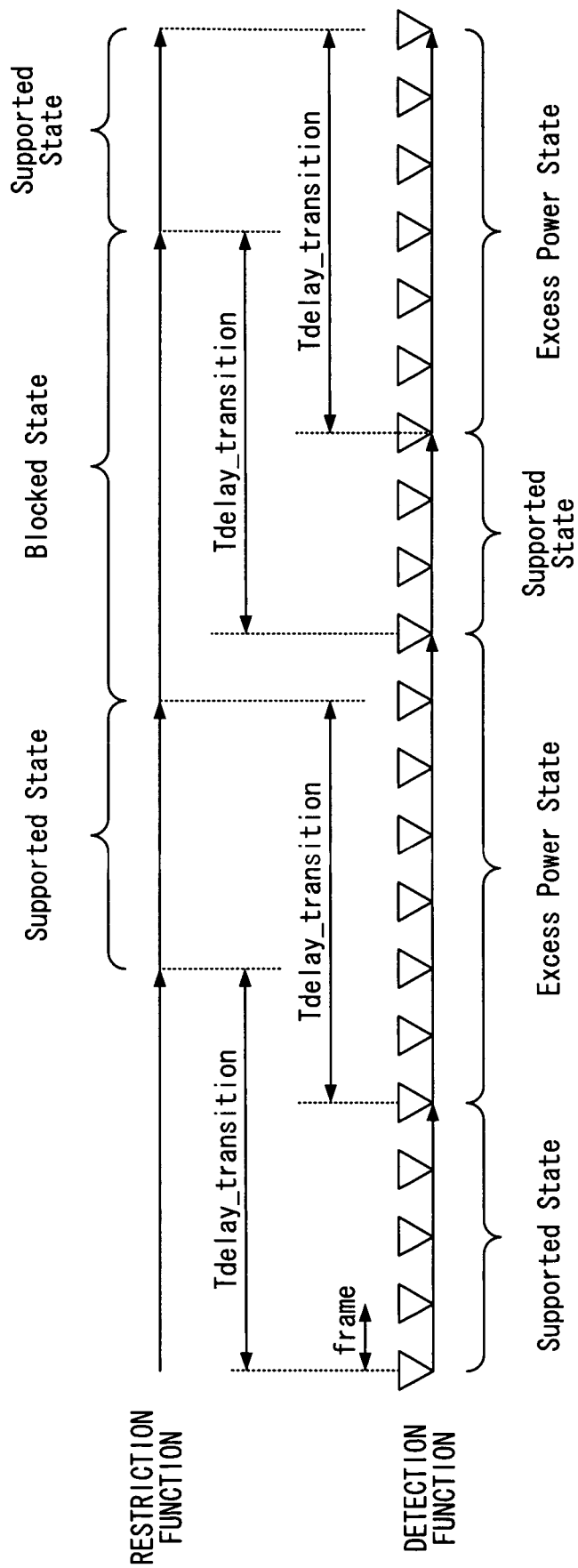
FIG. 4 shows timings of the TFCS restriction function.
Figure 5:
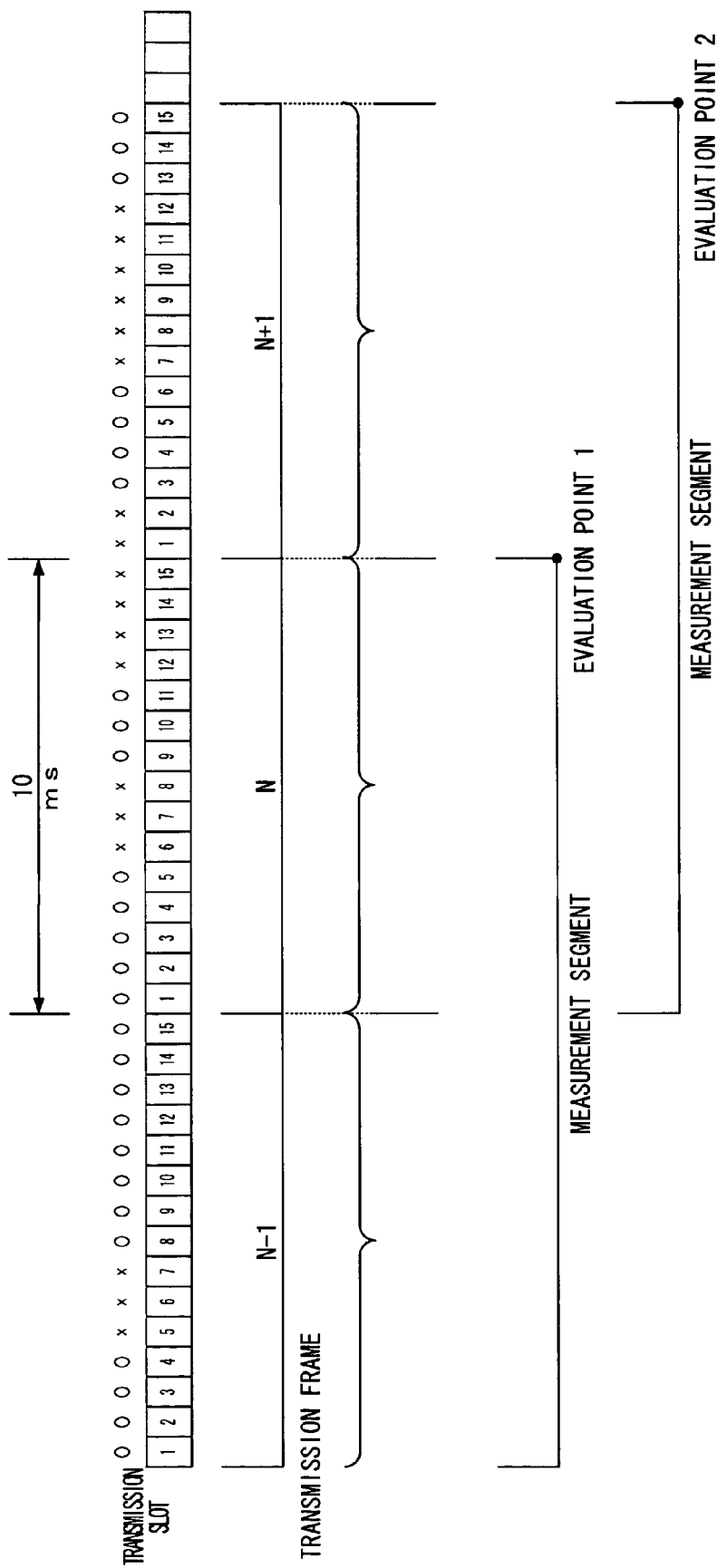
FIG. 5 shows an example of timings of the TFCS detection function.
Figure 6:
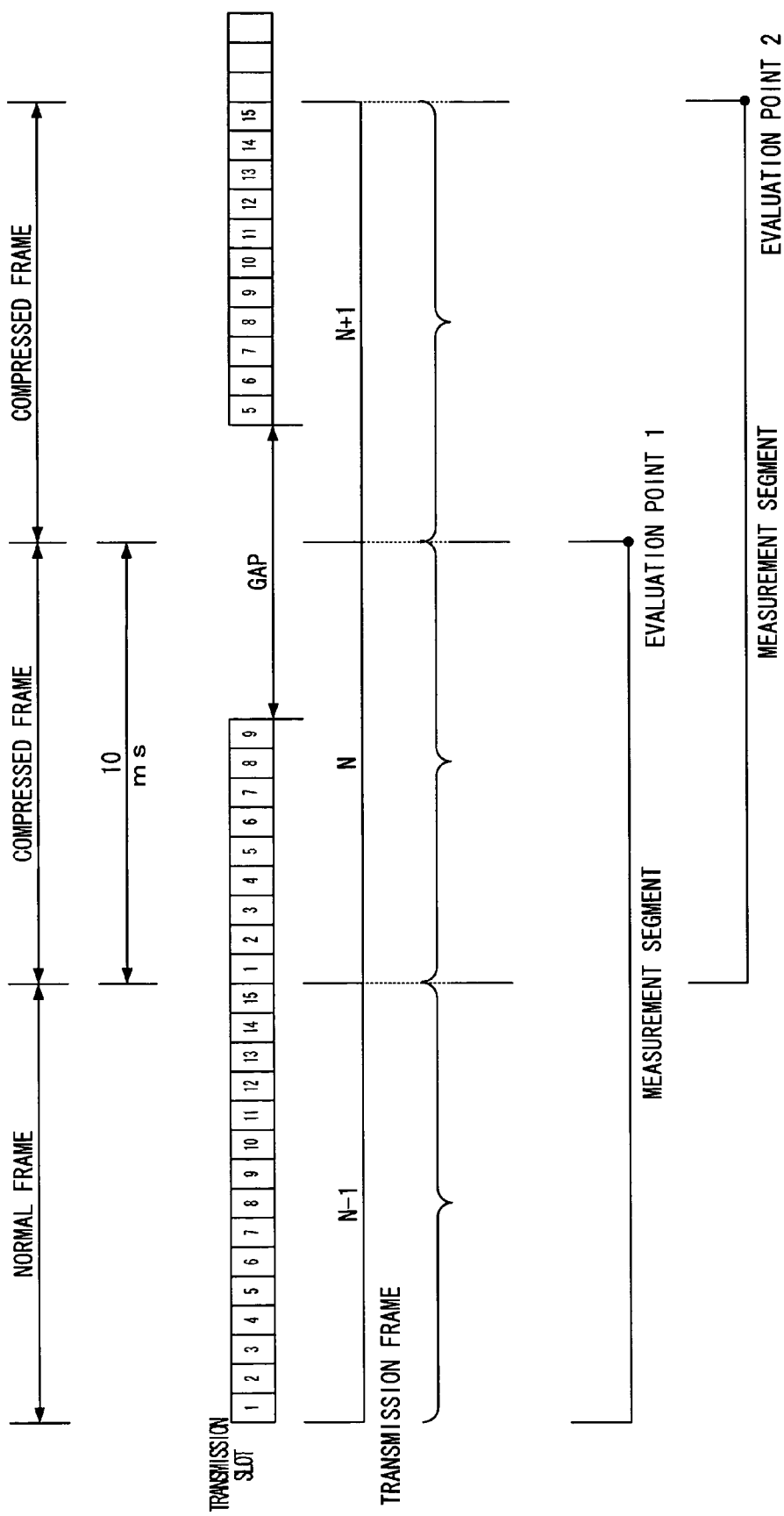
FIG. 6 illustrates a relationship between the timings of the TFCS detection function and the compressed mode.
Figure 7:
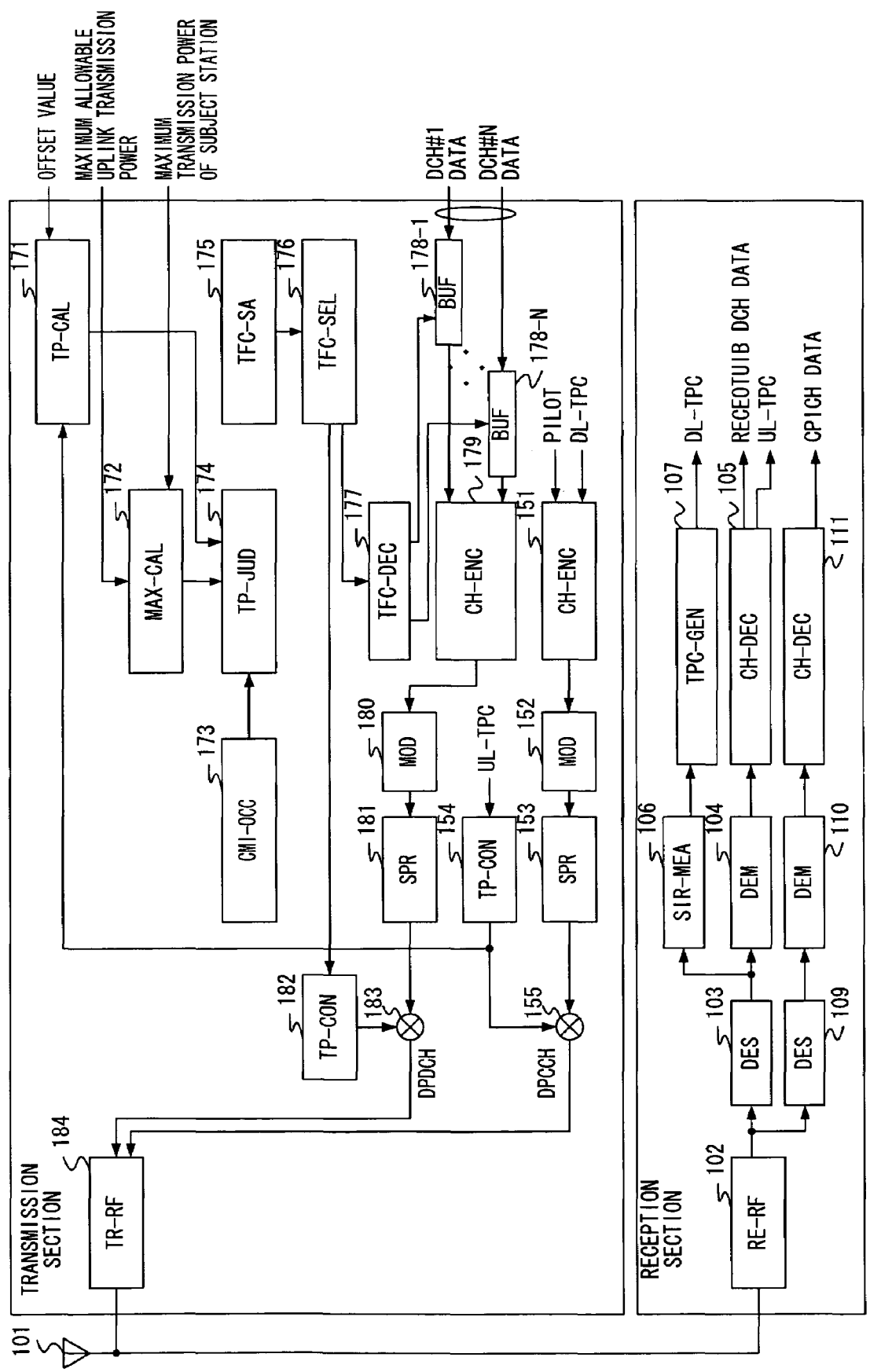
FIG. 7 is a block diagram showing a configuration of the communication terminal apparatus according to Embodiment 1 of the present invention.

FIG. 7 is a block diagram showing the configuration of the communication terminal apparatus according to Embodiment 1 of the present invention.

First, the configuration of a reception section of the communication terminal apparatus of FIG. 7 will be described.

Reception radio section (RE-RF) 102 down-converts a signal received at antenna 101 to a baseband signal and performs A/D conversion processing.

Despreading section (DES) 103 performs despreading processing on the output signal of reception radio section 102 using a spreading code for DCH. Demodulation section (DEM) 104 performs demodulation processing on the output signal of despreading section 103. Channel decoding section (CH-DEC) 105 performs decoding processing on the output signal of demodulation section (DEM) 104 and extracts reception DCH data and a transmission power control command for uplink (hereinafter referred to as "UL-TPC"). UL-TPC is inputted to transmission power control section (TP-CON) 154.

SIR measurement section (SIR-MEA) 106 measures desired signal power of the output signal of despreading section 103, calculates interference signal power from a dispersion value of the desired signal power, and measures a ratio between the desired signal power and interference signal power (hereinafter referred to as "SIR"). TPC generating section (TPC-GEN) 107 generates a transmission power control command for downlink (hereinafter referred to as "DL-TPC") directing to increase or decrease the transmission power of downlink according to the magnitude relation between reception SIR and targeted SIR of downlink. DL-TPC is inputted to channel encoding section (CH-ENC) 151.

Despreading section (DES) 109 performs despreading processing using a spreading code for CPICH (common pilot channel) on the output signal of reception radio section 102. Demodulation section (DEM) 110 demodulates the output signal of despreading section 109. Channel decoding section (CH-DEC) 111 performs decoding and extracts CPICH data.

Next, the configuration of a transmission section of the communication terminal apparatus of FIG. 7 will be described.

Channel encoding section 151 performs encoding processing on a pilot symbol (PILOT) and DL-TPC. Modulation section (MOD) 152 performs modulation processing on the output signal of channel encoding section 151. Spreading section (SPR) 153 performs spreading processing on the output signal of modulation section 152. Transmission power control section 154 increases or decreases the stored transmission power based on UL-TPC and controls amplification section 155. Amplification section 155 amplifies the output signal of spreading section 153 based on control of transmission power control section 154 and outputs the result to transmission radio section (TR-RF) 184 as a DPCCH (dedicated control channel) signal.

TFC transmission power calculation section (TP-CAL) 171 calculates transmission power of each TFC by adding offset of each TFC to transmission power of DPCCH. As a result, transmission power of each TFC has predetermined offset for the transmission power of DPCCH. TFC transmission power calculation section 171 outputs the calculated transmission power of each TFC to transmission power judging section (TP-JUD) 174.

Maximum value calculation section (MAX-CAL) 172 inputs maximum allowable uplink transmission power set by the upper station (UTRAN: Universal Terrestrial Radio Access Network) and maximum transmission power of the station, and outputs the smaller one to transmission power judging section 174 as a maximum value (maximum transmission power Pmax).

When the compressed mode occurs, compressed mode information generating section (CMI-OCC) 173 outputs a transmission gap length and gap starting slot number to transmission power judging section 174.

Figure 8:
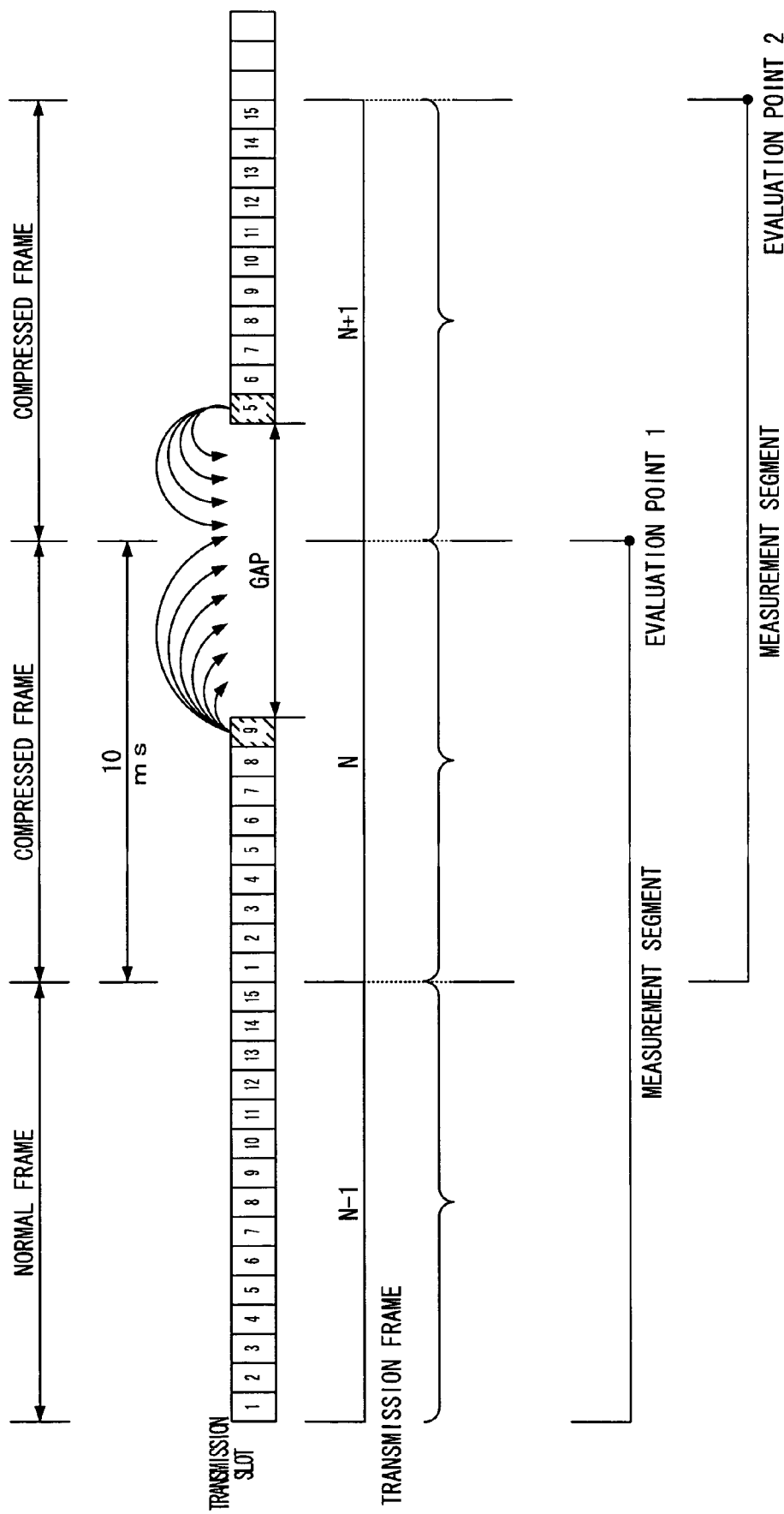
FIG. 8 illustrates the evaluation method using the detection function of the communication terminal apparatus according to the above-described embodiment.

Transmission power judging section 174 stores transmission power of the TFC and the maximum value for each TFC in a memory. Then, transmission power judging section 174 counts the number of slots where transmission power of the TFC exceeds the maximum value in a measurement period of Y slots (Y is an integer number of two or more, and it is assumed Y=30 in the following explanation) from immediately preceding past at a timing of a frame end. At this time, for each slot of the transmission gap period, transmission power judging section 174 replaces transmission power of the TFC by transmission power of the TFC of slots other than the transmission gap period. As original slots before the transmission power of the TFC is replaced, for example, a final slot of the immediately preceding normal frame, slots immediately preceding or immediately following the transmission gap period or the like can be given. FIG. 8 is an example of these, and shows the case where the transmission gap period extends across two frames of N frame and N+1 frame (double-frame method), and transmission power judging section 174 replaces the transmission power by transmission power of slot immediately preceding the transmission gap period (slot 9 of N frame) in the transmission gap period of N frame (slot 10 to slot 15=) replaces the transmission power by transmission power of slot immediately following the transmission gap period (slot 5 of N+1 frame) in the transmission gap period of N+1 frame (slot 1 to slot 4), and performs count processing at evaluation points 1 and 2. In addition, when the transmission gap period falls within one frame (single-frame method), it is possible to use an average value of transmission power between slots immediately preceding the transmission gap period and slots immediately following the transmission gap period, or a smaller value.

Then, transmission power judging section 174 outputs first information and second information to TFC state management section (TFC-SA) 175. The first information indicates whether or not there are X slots or more in which transmission power of TFC exceeds the maximum value in a measurement period (where X is an integer number of one and more, and it is assumed that X=15 in the following explanation), (in the case of X slots or more, the first information is "1", and in the case of less than X slots, the first information is "0"). The second information indicates whether or not there are one or more slots in which the transmission power of TFC exceeds the maximum value in the measurement period (in the case of one or more slots, the second information is "1", and in the case of less than one slot, the second information is "0").

TFC state management section 175 determines a state of each TFC based on the count result of transmission power judging section 174. To be more specific, TFC state management section 175 makes the TFC currently belonging to a supported state out of TFCs where the first information is "1" transit to an excess-power state (elimination criterion). Further, when the excess-power state continues for a predetermined period, the state is made to transit from the excess-power state to the blocked state (blocking criterion). Further, TFC state management section 175 makes the TFC currently belonging to the excess-power state or blocked state out of TFCs where the second information is "0" transit to the supported state (recovery criterion).

TFC selection section (TFC-SEL) 176 selects one TFC out of a TFC group belonging to the supported state, outputs the selected TFC to TFC decision section (TFC-DEC) 177. Further, TFC selection section 176 outputs the transmission power of the selected TFC to transmission power control section (TP-CON) 182.

TFC decision section 177 indicates each TF of the TFC selected at TFC selection section 176 to corresponding buffers (BUF) 178-1 to 178-N.

Buffers 178-1 to 178-N temporarily store data of corresponding DCH#1 to #N and output data corresponding to the TF indicated by TFC decision section 177 described later to channel encoding section (CH-ENC) 179.

Channel encoding section 179 performs encoding processing on the output signal of each of buffers 178-1 to 178-N. Modulation section (MOD) 180 performs modulation processing on the output signal of channel encoding section 179. Spreading section (SPR) 181 performs spreading processing on the output signal of modulation section 180. Transmission power control section 182 controls amplification section 183 so as to obtain transmission power outputted from TFC selection section 176. Amplification section 183 amplifies the output signal of spreading section 181 based on control of transmission power control section 182 and outputs the result as a DPDCH (dedicated data channel) signal to transmission radio section 184.

Transmission radio section 184 multiplexes the DPCCH and DPDCH signals, performs D/A conversion processing and up-conversion, and transmits the result by radio from antenna 101.

In this way, according to this embodiment, transmission power of the TFC in each slot in the transmission gap period of the compressed frame can be replaced by transmission power of the TFC of the slots other than the transmission gap period, so that it is possible to perform evaluation using a detection function even though the compressed mode occurs, and select an appropriate TFC.

In addition, in this embodiment, although the case has been described where transmission power of each slot in the transmission gap period is replaced by transmission power of the TFC of slots other than the transmission gap period, the present invention is not limited to this, and it is possible to adopt a configuration where transmission power of each slot in the transmission gap period is replaced by a predetermined constant (for example, "0").

Embodiment 2

Figure 9:
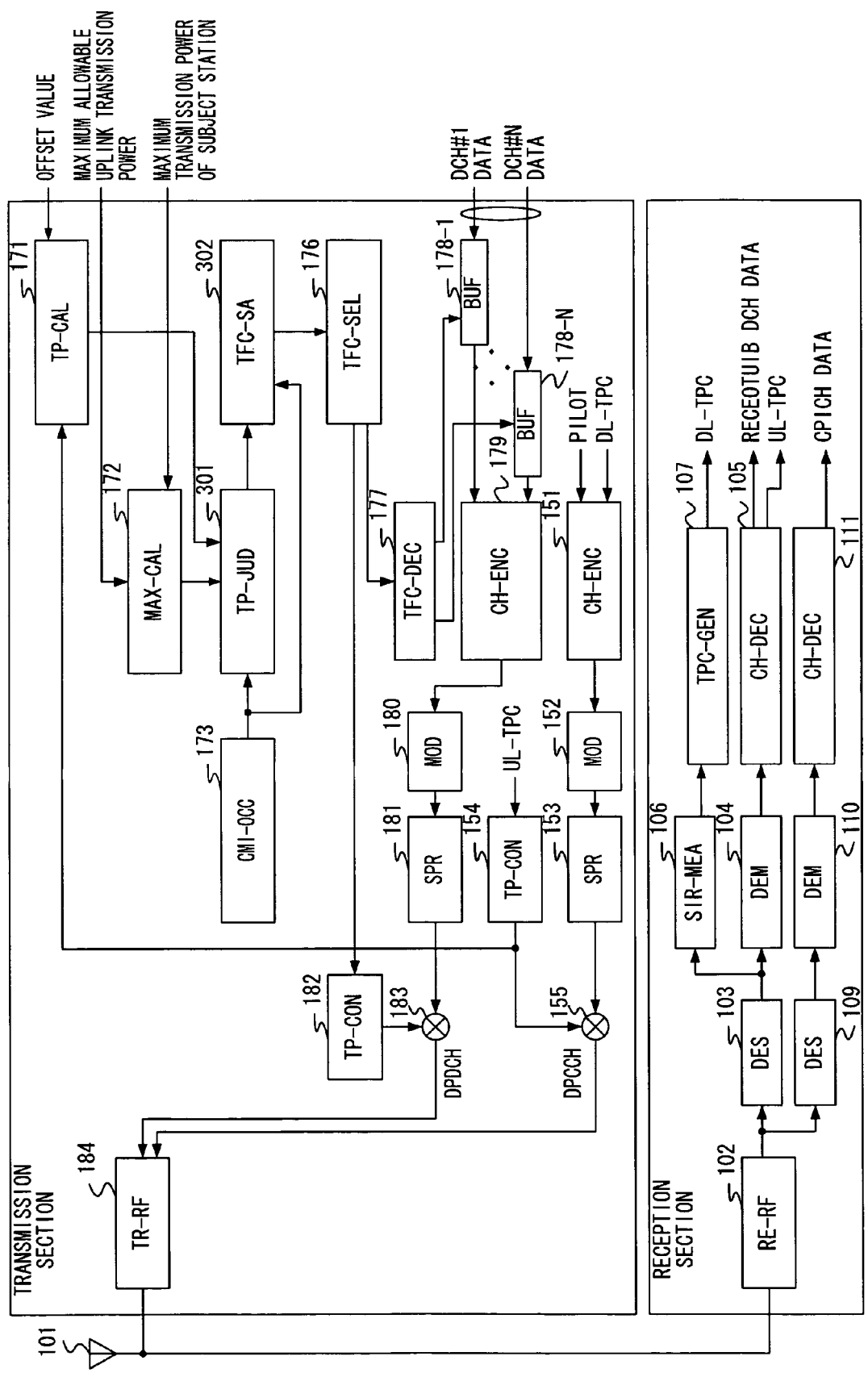
FIG. 9 is a block diagram showing a configuration of the communication terminal apparatus according to Embodiment 2 of the present invention.

FIG. 9 is a block diagram showing a configuration of the communication terminal apparatus according to Embodiment 2 of the present invention. In FIG. 9, the components that are common with ones in FIG. 7 will be assigned the same reference numerals as in FIG. 7 without further explanations.

The communication terminal apparatus in FIG. 9 has different operation of transmission power judging section (TP-JUD) 301 and TFC state management section (TFC-SA) 302 from transmission power judging section 174 and TFC state management section 175 in FIG. 7.

When the compressed mode occurs, compressed mode information generating section 173 outputs a transmission gap length and gap starting slot number to transmission power judging section 301 and TFC state management section 302.

Transmission power judging section 301 stores transmission power and maximum value of the TFC for each TFC in a memory. Then, transmission power judging section 301 counts the number of slots in which transmission power of the TFC exceeds the maximum value for each TFC in measurement period of Y slots from a immediately preceding past at a timing of a frame end and outputs the first information and second information based on the count result to TFC state management section 302. Transmission power judging section 301 does not perform count processing when there is a transmission gap period in the measurement period.

Figure 10:
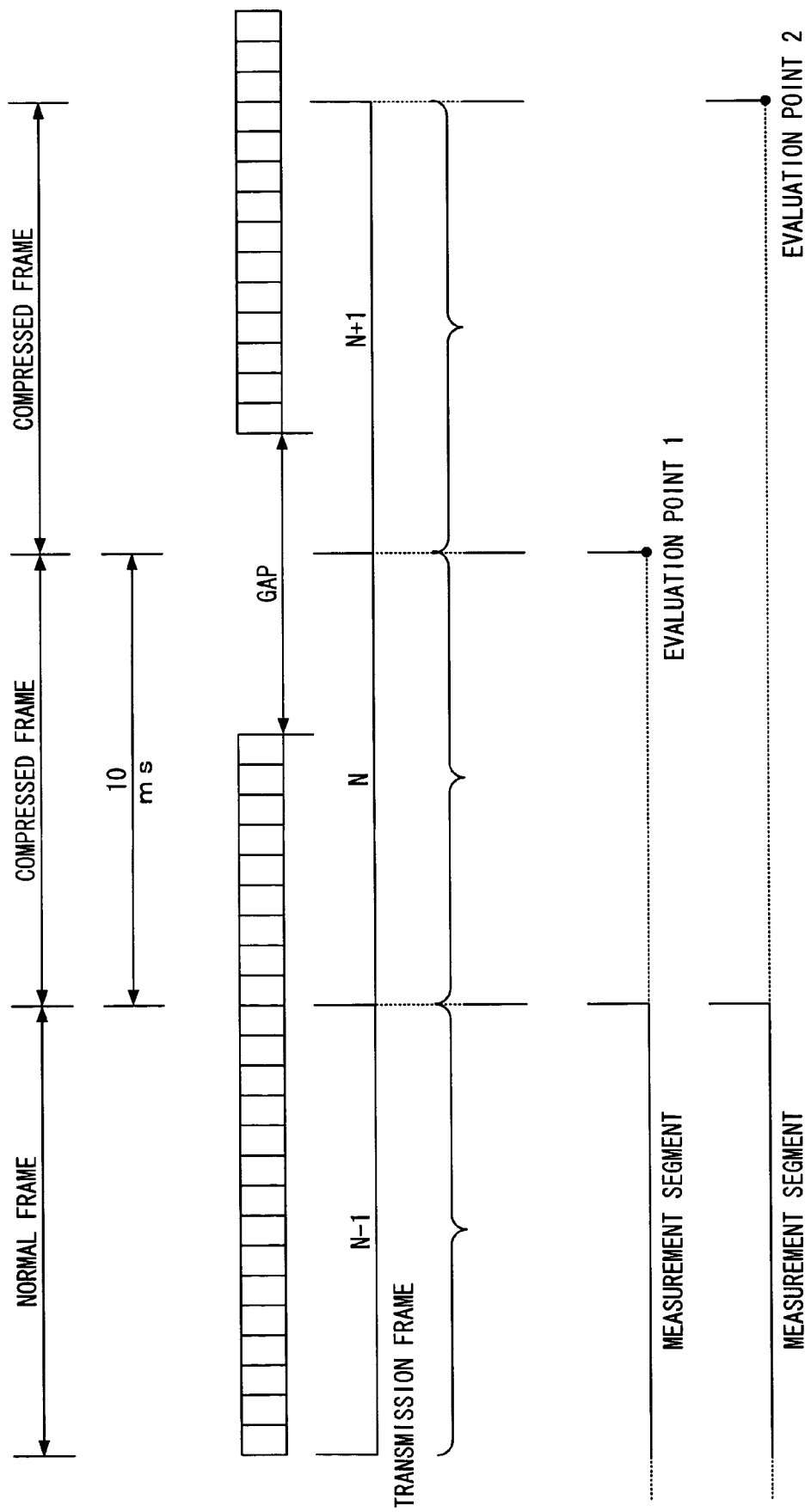
FIG. 10 illustrates the evaluation method using the detection function of the communication terminal apparatus according to the above-described embodiment.

TFC state management section 302 determines each TFC state based on the count result of transmission power judging section 301. Here, as shown in FIG. 10, when there is a transmission gap period in the measurement period, TFC state management section 302 determines each TFC state according to the previous count result.

In this way, according to this embodiment, transmission power judging section 301 does not perform count processing when there is a transmission gap period in the measurement period, so that it is possible to reduce the amount of calculation compared to Embodiment 1 and reduce power consumption, in addition to the advantage of Embodiment 1.

Embodiment 3

The configuration of the communication terminal apparatus according to Embodiment 3 of the present invention is the same as FIG. 7 of Embodiment 1. In this embodiment, operation of transmission power judging section 174 is different from Embodiment 1.

Figure 11:
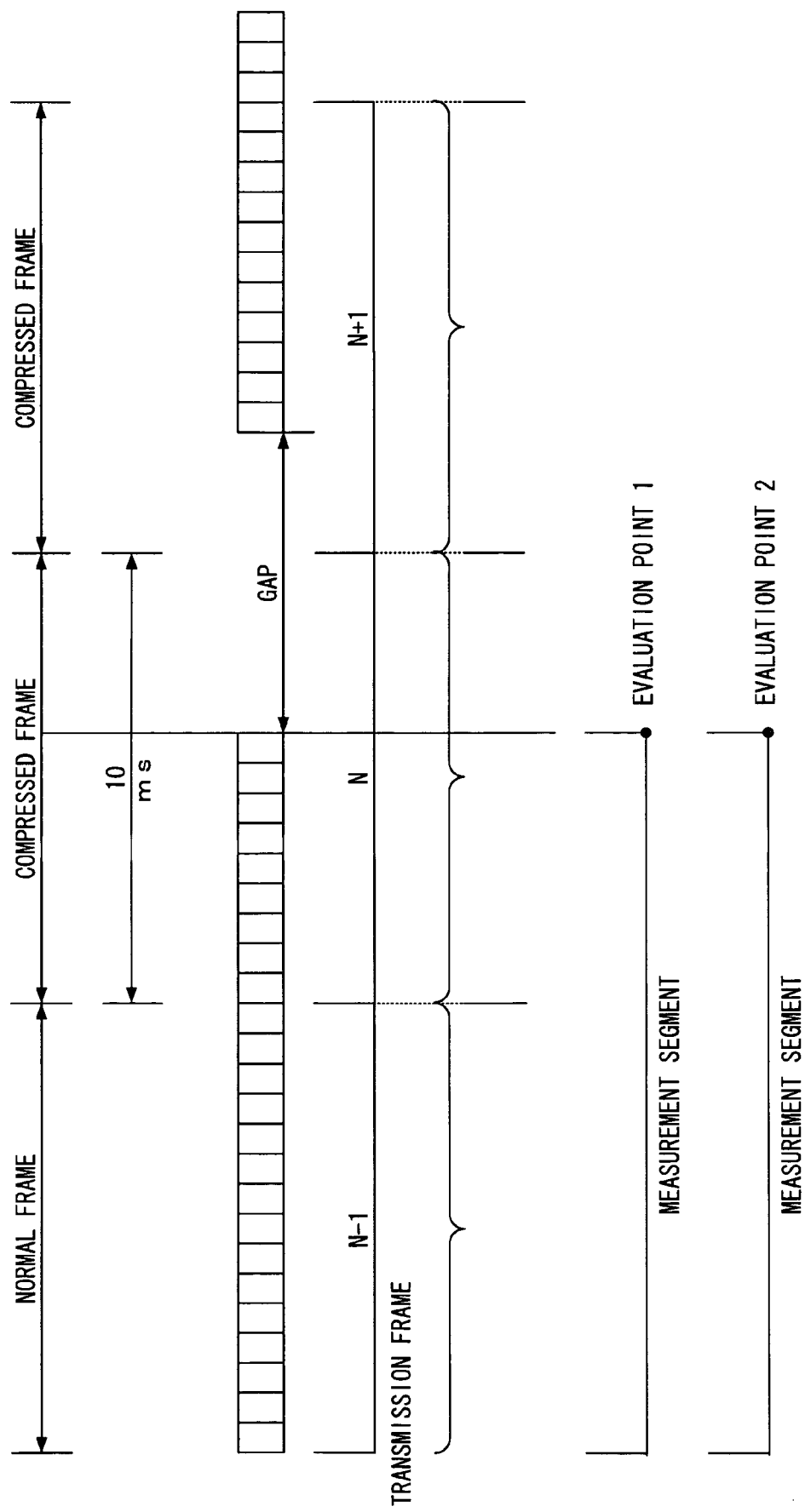
FIG. 11 illustrates the evaluation method using the detection function of the communication terminal apparatus according to Embodiment 3 of the present invention.

Transmission power judging section 174 stores transmission power and maximum value of the TFC for each TFC in a memory. Then, as shown in FIG. 11, transmission power judging section 174 counts the number of slots in which transmission power of the TFC exceeds the maximum value in the measurement period of Y slots from the immediately preceding past for each slot at a timing of a frame end when there is no transmission gap period in past Y slots from a timing of the frame end, and at a timing of the slot immediately before the transmission gap period when there is a transmission gap period. Then, transmission power judging section 174 outputs the first information and second information based on the count result to TFC state management section 175.

In this way, according to this embodiment, when there is a transmission gap period in past Y slots from the timing of the frame end, count processing can be performed by shifting an evaluation point to the timing of the immediately preceding slot of the transmission gap period, so that it is possible to perform evaluation using a detection function and select an appropriate TFC even when the compressed mode occurs.

Embodiment 4

The configuration of the communication terminal apparatus according to Embodiment 4 of the present invention is the same as FIG. 7 of Embodiment 1. In this embodiment, the operation of transmission power judging section 174 is different from Embodiment 1.

Figure 12:
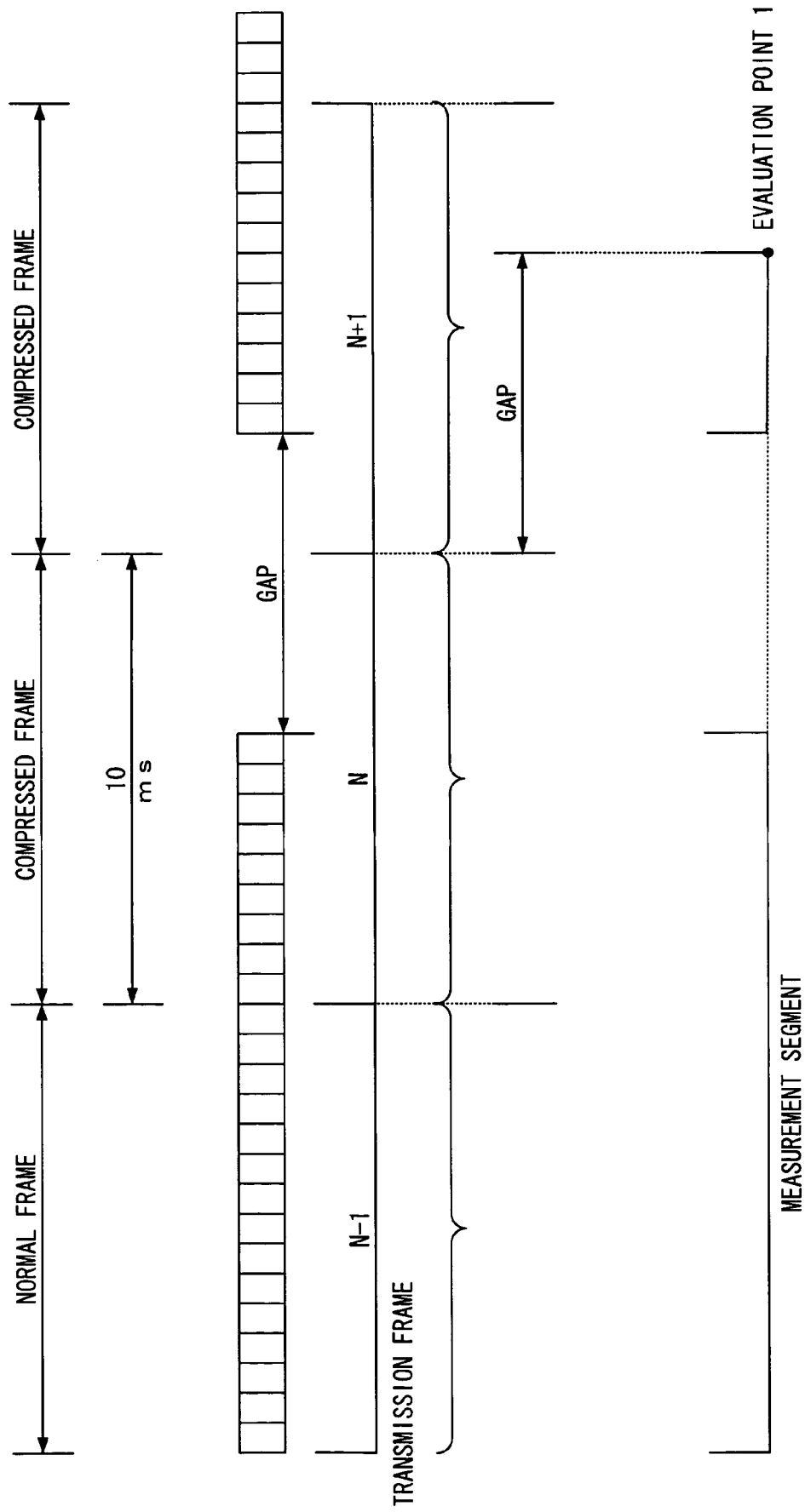
FIG. 12 illustrates the evaluation method using the detection function of the communication terminal apparatus according to Embodiment 4 of the present invention.

Transmission power judging section 174 stores transmission power and maximum value of the TFC for each TFC in a memory. Then, as shown in FIG. 12, transmission power judging section 174 counts the number of slots in which transmission power of the TFC exceeds the maximum value in the measurement period of Y slots from the immediately preceding past except the transmission gap period for each TFC at a timing of a frame end when there is no gap segment in past Y slots from a timing of the frame end, and at a timing after a lapse of the transmission gap period from the timing of the frame end when there is a transmission gap period. Then, transmission power judging section 174 outputs the first information and second information based on the count result to TFC state management section 175.

In this way, according to this embodiment, when there is a transmission gap period in past Y slots from the timing of the frame end, count processing can be performed by shifting an evaluation point to the timing after a lapse of the transmission gap period, so that it is possible to perform evaluation using a detection function and select an appropriate TFC even when the compressed mode occurs.

Embodiment 5

Figure 13:
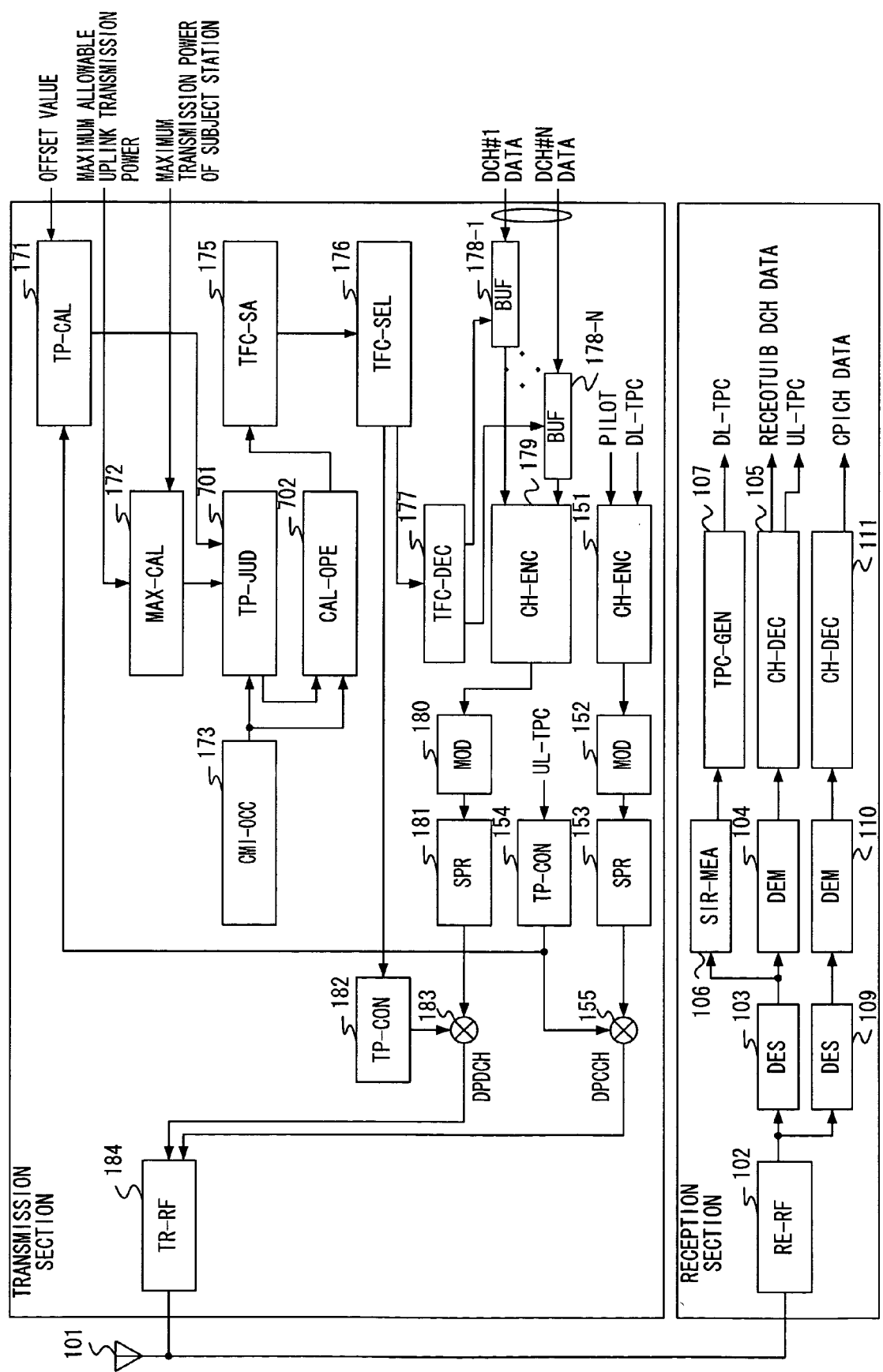
FIG. 13 is a block diagram showing a configuration of the communication terminal apparatus according to Embodiment 5 of the present invention.

FIG. 13 is a block diagram showing a configuration of the communication terminal apparatus according to Embodiment 5 of the present invention. Components in FIG. 13 that are common with ones in FIG. 7 will be assigned the same reference numerals as in FIG. 7 without further explanations.

The communication terminal apparatus in FIG. 13 adopts a configuration in which count calculation section (CAL-OPE) 702 is added to FIG. 7. Further, the communication terminal apparatus in FIG. 13 has different operation of transmission power judging section (TP-JUD) 701 from transmission power judging section 174 in FIG. 7.

When the compressed mode occurs, compressed mode information generating section 173 outputs the transmission gap length and gap starting slot number to transmission power judging section 701 and count calculation section 702.

Figure 14:
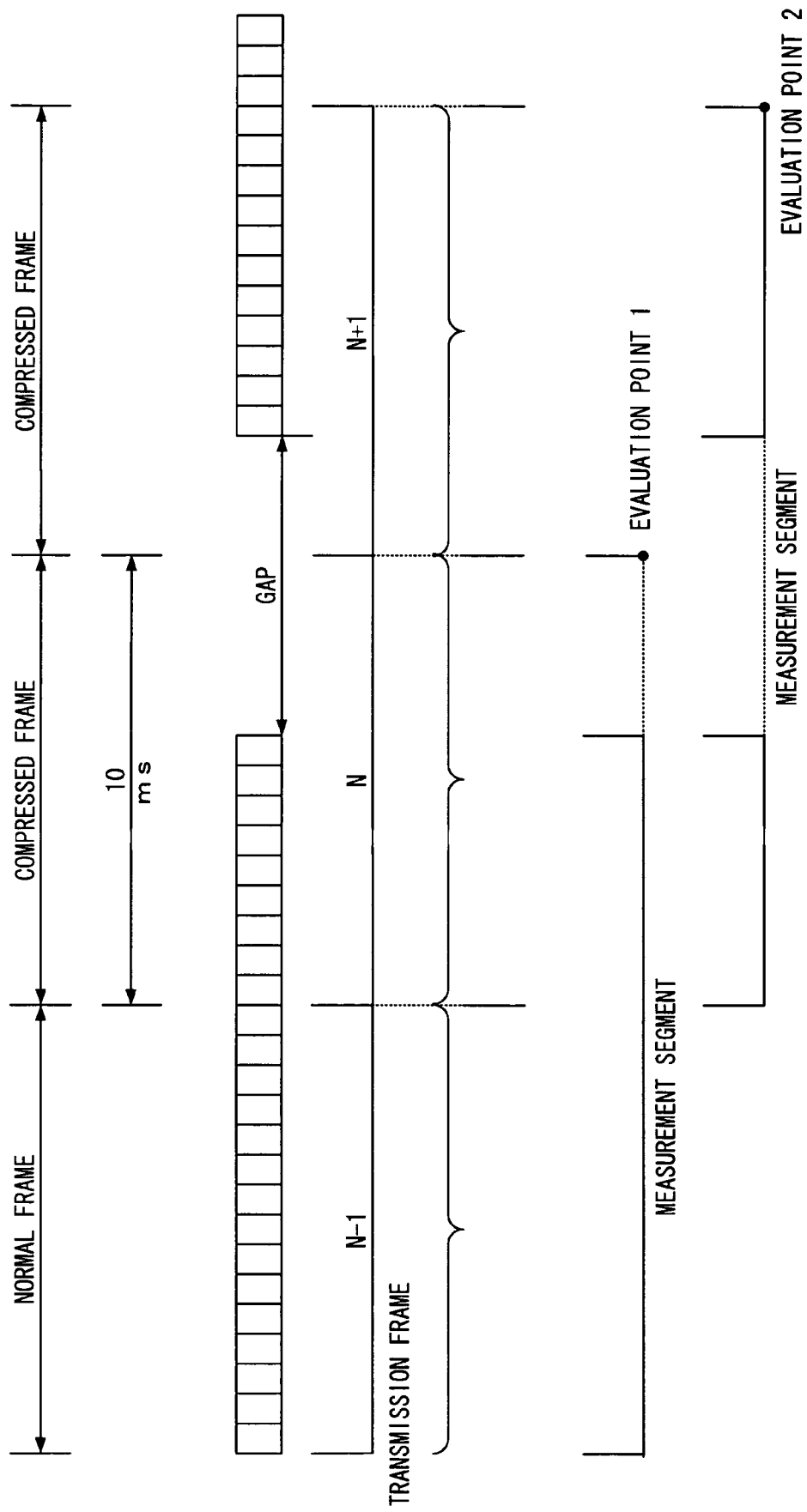
FIG. 14 illustrates the evaluation method using the detection function of the communication terminal apparatus according to the above-described embodiment.

Transmission power judging section 701 stores the transmission power and maximum value of the TFC for each TFC in a memory. Then, transmission power judging section 701 counts the number of slots in which transmission power of the TFC exceeds the maximum value for each TFC in the measurement period of Y slots from the immediately preceding past at a timing of a frame end and outputs the result to count calculation section 702. As shown in FIG. 14, transmission power judging section 701 does not perform count processing on the slots in the transmission gap period.

Count calculation section 702 multiplies the count result of transmission power judging section 701 by coefficients of $Y/(Y-M)$ (where M is the number of slots in the transmission gap period included in the measurement period) and outputs first information and second information to TFC state management section 175. The first information indicates whether or not the count result (value in which the number of slots where transmission power of TFC exceeds the maximum value in the measurement period is multiplied by the coefficients) is X slots or more (in the case of X slots or more, the first information is "1," and, in the case of less than X slots, the first information is "0"). The second information indicates whether or not there are one or more slots in which the count result exceeds the maximum value (in the case of one or more slots, the second information is "1," and, in the case of less than one slot, the second information is "0").

TFC state management section 175 determines each TFC state based on the count result of count calculation section 702.

In this way, according to this embodiment, by multiplying the count result by coefficients, regardless of the presence of the transmission gap period in the measurement period, evaluation can be performed with maintaining the ratio of the number of slots in which transmission power of TFC exceeds the maximum value to the number of slots that are targets of measurement, so that it is possible to perform evaluation using a detection function and select an appropriate TFC even when the compressed mode occurs.

In addition, as a calculation method for generating the first information implemented in the above-described count calculation section 702, the first information can be generated according to whether or not the result of subtracting $X(Y-M)$ from the value in which Y is multiplied by the count result of transmission power judging section 701 is equal to or greater than zero. In particular, when X is 15 and Y is 30, judging is possible according to whether or not the result of subtracting (30−M) from the double value of the above-described count result is equal to or greater than zero, so that it is possible to simplify the calculation.

Further, as a calculation method for generating the second information implemented in the above-described count calculation section 702, as in Embodiment 1, it is possible to generate the second information simply according to whether or not there are one ore more slots in which transmission power of TFC exceeds the maximum value in the measurement period.

The present application is based on Japanese Patent Application No. 2004-193528, filed on Jun. 30, 2004, the entire content of which is expressly incorporated herein by reference.

INDUSTRIAL APPLICABILITY

The present invention is used in a radio communication system of a CDMA scheme and suitable for use in a communication terminal apparatus performing TFC selection.

The invention claimed is:

1. A communication terminal apparatus provided with a transmission gap period where a slot is not transmitted upon a compressed mode, comprising:
   a transmission power calculation section that calculates transmission power of each TFC (trans format combination);
   a maximum value calculation section that calculates a maximum value of transmission power for TFC;
   a transmission power judging section that counts in a radio frame the number of slots in which the transmission power of each TFC exceeds the maximum value in a measurement period of N slots (N is an integer number of two or more) from an immediately preceding past at least once and at a predetermined timing;
   a count calculation section that multiplies a count result of the transmission power judging section by predetermined coefficients;
   a TFC state management section that determines each TFC state according to a count result of the count calculation section; and
   a TFC selection section that selects one TFC out of TFCs in a predetermined state.

2. The communication terminal apparatus according to claim 1, wherein the count calculation section multiplies the count result of the transmission power judging section by coefficients of N/(N−M) (where M is the number of slots in the transmission gap period included in the measurement period).

3. The communication terminal apparatus according to claim 1, wherein the count calculation section subtracts a value in which (N−M) is multiplied by a constant (where M is the number of slots in the transmission gap period included in the measurement period) from a value in which the count result of the transmission power judging section is multiplied by N.

* * * * *